(12) United States Patent
Wilson et al.

(10) Patent No.: US 6,506,021 B1
(45) Date of Patent: Jan. 14, 2003

(54) COOLING SYSTEM FOR A GAS TURBINE

(75) Inventors: Ian David Wilson, Mauldin, SC (US); Samir Armando Salamah, Niskayuna, NY (US); Noel Jacob Bylina, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/984,826

(22) Filed: Oct. 31, 2001

(51) Int. Cl.$^7$ .................................................. F01D 5/18
(52) U.S. Cl. ....................... 416/96 R; 415/115; 415/136
(58) Field of Search ................................. 415/115, 116, 415/136; 416/96 R

(56) References Cited

U.S. PATENT DOCUMENTS

| | | | |
|---|---|---|---|
| 4,118,136 A | * 10/1978 | Corsmeier et al. | .......... 403/386 |
| 5,593,274 A | 1/1997 | Carreno et al. | |
| 6,053,701 A | * 4/2000 | Ichiryu et al. | ............ 416/96 R |
| 6,185,924 B1 | * 2/2001 | Matsumoto et al. | ........ 60/39.75 |

OTHER PUBLICATIONS

"39$^{th}$ GE Turbine State–of–the–Art Technology Seminar", Tab 1, "Technology—the First Half Half–Million Operating Hours", H.E. Miller, Aug. 1996.
"39th GE Turbine State–of–the–Art Technology Seminar", Tab 2, "GE Heavy–Duty Gas Turbine Performance Characteristics", F. J. Brooks, Aug. 1996.
"39th GE Turbine State–of–the–Art Technology Seminar", Tab 3, "9EC 50Hz 170–MW Class Gas Turbine", A. S. Arrao, Aug. 1996.
"39th GE Turbine State–of–the–Art Technology Seminar", Tab 4, "MWS6001FA—An Advanced–Technology 70–MW Class 50/60 Hz Gas Turbine", Ramachandran et al., Aug. 1996.
"39th GE Turbine State–of–the–Art Technology Seminar", Tab 5, "Turbomachineray Technology Advances at Nuovo Pignone", Benvenuti et al., Aug. 1996.
"39th GE Turbine State–of–the–Art Technology Seminar", Tab 6, "GE Aeroderivative Gas Turbine—Design and Operating Features", M.E. Horner, Aug. 1996.
"39th GE Turbine State–of–the–Art Technology Seminar", Tab 7, "Advance Gas Turbine Materials and Coatings", P.W. Schilke, Aug. 1996.

(List continued on next page.)

Primary Examiner—Edward K. Look
Assistant Examiner—Ninh Nguyen
(74) Attorney, Agent, or Firm—Nixon & Vanderhye

(57) ABSTRACT

A plurality of arcuate circumferentially spaced supply and return manifold segments are arranged on the rim of a rotor for respectively receiving and distributing cooling steam through exit ports for distribution to first and second-stage buckets and receiving spent cooling steam from the first and second-stage buckets through inlet ports for transmission to axially extending return passages. Each of the supply and return manifold segments has a retention system for precluding substantial axial, radial and circumferential displacement relative to the rotor. The segments also include guide vanes for minimizing pressure losses in the supply and return of the cooling steam. The segments lie substantially equal distances from the centerline of the rotor and crossover tubes extend through each of the segments for communicating steam between the axially adjacent buckets of the first and second stages, respectively.

24 Claims, 7 Drawing Sheets

OTHER PUBLICATIONS

"39th GE Turbine State–of–the–Art Technology Seminar", Tab 8, "Dry Low $NO_x$ Combustion Systems for GE Heavy–Duty Turbines", L. B. Davis, Aug. 1996.

"39th GE Turbine State–of–the–Art Technology Seminar", Tab 9, "Gas Fuel Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines, "J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Conbined–Cycle Power Systems", M. Boss, Aug. 1996.

"39th GE Turbine State–of–the–Art Technology Seminar", Tab 26, "Congeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminr", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Progra—Conceptual Design and Product Development", Annual Report, Sep. 1, 1994–Aug. 31, 1995.

"Advanced Turbine Systems (ATS Program) Conceptual Design and Product Development", Final Technical Progress Report, vol. 2–Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos. DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Program Validates High Efficiency, Reliability of GE's Advanced 'H' Gas Turbine Technology", GE Introduces Advanced Gas Turbines Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public (Jun. 15, 1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the 21st Century—"H" Gas Turbine Combined Cycles", Thomas C. Paul et al., Report.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting"; vol. I, "Industrial Advanced Turbine Systems Program Overview", D.W. Esbeck, p. 3–13, Oct., 1995.

"Proceedings of the Advanced Turbine Systems Annual Program Review Meeting", vol. I, "H Gas Turbine Combined Cycle", J. Corman, p. 14–21, Oct., 1995.

"Proceedings of the Advanced Turbine Systems Annual Program Review Meeting", vol. I, "Overview of Westinghouse's Advanced Turbine Systems Program", Bannister et al., p. 22–30, Oct., 1995.

"Proceedings of the Advanced Turbine Systems Annual Program Review Meeting", vol. I, "Allison Engine ATS Program Technical Review", D. Mukavetz, p. 31–42, Oct., 1995.

"Proceedings of the Advanced Turbine Systems Annual Program Review Meeting", vol. I, "Advanced Turbine Systems Program Industrial System Concept Development", S. Gates, p. 43–63, Oct., 1995.

"Proceedings of the Advanced Turbine Systems Annual Program Review Meeting", vol. I, "Advanced Turbine System Program Phase 2 Cycle Selection", Latcovich, Jr., p. 64–69, Oct., 1995.

"Proceedings of the Advanced Turbine Systems Annual Program Review Meeting", vol. I, "General Electric ATS Program Technical Review Phase 2 Activities", Chance et al., p. 70–74, Oct., 1995.

"Proceedings of the Advanced Turbine Systems Annual Program Review Meeting", vol. I, "Technical Review of Westinghouse's Advanced Turbine Systems Program", Diakunchak et al., p. 75–86, Oct., 1995.

"Proceedings of the Advanced Turbine Systems Annual Program Review Meeting", vol. I, "Advanced Combustion Turbines and Cycles: An EPRI Perspective", Touchton et al., p. 87–88, Oct., 1995.

"Proceedings of the Advanced Turbine Systems Annual Program Review Meeting", vol. I, "Advanced Turbine Systems Annual Program Review", William E. Kopp, p. 89–92, Oct., 1995.

"Proceedings of the Advanced Turbine Systems Annual Program Review Meeting", vol. I, "The AGTSR Consortium: An Update", Fant et al., p. 93–102, Oct., 1995.

"Proceedings of the Advanced Turbine Systems Annual Program Review Meeting", vol. I, "Overview of Allison/AGTSR Interactions", Sy A. Ali, p. 103–106, Oct., 1995.

"Proceedings of the Advanced Turbine Systems Annual Program Review Meeting", vol. I, "Design Factors for Stable Lean Premix Combustion", Richards et al., p. 107–113, Oct., 1995.

"Proceedings of the Advanced Turbine Systems Annual Program Review Meeting", vol. I, "Ceramic Stationary as Turbine", M. van Roode, p. 114–147, Oct., 1995.

"Proceedings of the Advanced Turbine Systems Annual Program Review Meeting", vol. I, "DOE/Allison Ceramic Vane Effort", Wenglarz et al., p. 148–151, Oct., 1995.

"Proceedings of the Advanced Turbine Systems Annual Program Review Meeting", vol. I, "Materials/Manufacturing Element of the Advanced Turbine Systems Program", Karnitz et al., p. 152–160, Oct., 1995.

"Proceedings of the Advanced Turbine Systems Annual Program Review Meeting", vol. I, "Land–Based Turbine Casting Initiative", Mueller et al., p. 161–170, Oct., 1995.

"Proceedings of the Advanced Turbine Systems Annual Program Review Meeting", vol. I, "Turbine Airfoil Manufacturing Technology", Kortovich, p. 171–181, Oct., 1995.

"Proceedings of the Advanced Turbine Systems Annual Program Review Meeting", vol. I, "Pratt & Whitney Thermal Barrier Coatings", Bornstein et al., p. 182–193, Oct., 1995.

"Proceedings of the Advanced Turbine Systems Annual Program Review Meeting", vol. I, "Westinhouse Thermal Barrier Coatings", Goedjen et al., p. 194–199, Oct., 1995.

"Proceedings of the Advanced Turbine Systems Annaul Program Review Meeting", vol. I, "High Performance Steam Development", Duffy et al., p. 200–220, Oct., 1995.

"Proceedings of the Advanced Turbine Systems Annual Program Review Meeting", vol. I, "Lean Premixed Combustion Stabilized by Radiation Feedback and heterogeneous Catalysis", Dibble et al., p. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. p. 233–248, Oct., 1995.

"Proceedings of the Advanced Turbine Systems Annual Program Review Meeting", vol. II, "Lean Premixed Flames for Low $No_x$ Combustors", Sojka et al., p. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., p. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., p. 281–309, Oct., 1995.

"Proceedings of the Advanced Turbine Systems Annual Program Review Meeting", vol. II, "Life Prediction of Advanced Materials for Gas Turbine Application", Zamrik et al., p. 310–327, Oct., 1995.

"Proceedings of the Advanced Turbine Systems Annual Program Review Meeting", vol. II, "Advanced Combustion Technologies for Gas Turbine Power Plants", Vandsburger et al., p. 328–352, Oct., 1995.

"Proceedings of the Advanced Turbine Systems Annual Program Review Meeting", vol. II, "Combustion Modeling in Advanced Gas Turbine Systems", Smoot et al., p. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. p. 371–390, Oct., 1995.

"Proceedings of the Advanced Turbine Systems Annual Program Review Meeting", vol. II, "Rotational Effects on Turbine Blade Cooling", Govatzidakia et al., p. 391–392, Oct., 1995.

"Proceedings of the Advanced Turbine Systems Annual Program Review Meeting", vol. II, "Manifold Methods for Methane Combustion", Yang et al., p. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., p. 410–414, Oct., 1995.

"Proceedings of the Advanced Turbine Systems Annual Program Review Meeting", vol. II, The Role of Reactant Unmixedness, Strain Rate, and Length Scale on Premixed Combustor Performance, Samuelson et al., p. 415–422, Oct., 1995.

"Proceedings of the Advanced Turbine Systems Annual Program Review Meeting", vol. II, "Experimental and Computational Studies of Film Cooling With Compound Angle Injection", Goldstein et al., p. 423–451, Oct., 1995.

"Proceedings of the Advanced Turbine Systems Annual Program Review Meeting", vol. II, "Compatibility of Gas Turbine Materials with Steam Cooling", Desai et al., p. 452–464, Oct., 1995.

"Proceedings of the Advanced Turbine Systems Annual Program Review Meeting", vol. II, "Use of a Laser–Induced Fluorescence Thermmal Imaging System for Film Cooling Heat Transfer Measurement", M. K. Chyu, p. 465–473, Oct., 1995.

"Proceedings of the Advanced Turbine Systems Annual Program Review Meeting", vol. II, Effects of Geometry on Slot–Jet Film Cooling Performance, Hyams et al., p. 474–496 Oct., 1995.

"Proceedings of the Advanced Turbine Systems Annual Program Review Meeting", vol. II, "Steam as Turbine Blade Coolant: Experimental Data Generation", Wilmsen et al., p. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., p. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., p. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., p. 529–538, Oct., 1995.

"Proceedings of the Advanced Turbine Systems Annual Program Review Meeting", vol. II, "Bond Strength and Stress Measurements in Thermal Barrier Coatings", Gell et al., p. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., p. 550–551, Oct., 1995.

"Proceedings of the Advanced Turbine Systems Annual Program Review Meeting", vol. II, "Combustion Instability Modeling and Analysis", Santoro et al., p. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., p. 560–565, Oct., 1995.

"Proceedings of the Advanced Turbine Systems Annual Program Review Meeting", vol. II, "Heat Pipe Turbine Vane Cooling", Langston et al., p. 566–572, Oct., 1995.

"Proceedings of the Advanced Turbine Systems Annual Program Review Meeting", vol. II, "Improved Modeling Techniques for Turbomachinery Flow Fields", Lakshminarayana et al., p. 573–581, Oct., 1995.

"Proceedings of the Advanced Turbine Systems Annual Program Review Meeting", vol. II, "Advanced 3D Inverse Method for Designing Turbomachinery Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, p. 3–16, Nov., 1996.

"Proceedings of the Advanced Turbine Systems Annual Program Review Meeting", "Power Needs in the Chemical Industry", Keith Davidson, p. 17–26, Nov., 1996.

"Proceedings of the Advanced Turbine Systems Annual Program Review Meeting", "Advanced Turbine Systems Program Overview", David Esbeck, p. 27–34, Nov., 1996.

"Proceedings of the Advanced Turbine Systems Annual Program Review Meeting", "Westinghouse's Advanced Turbine Systems Program", Gerard McQuiggan, p. 35–48, Nov., 1996.

"Proceedings of the Advanced Turbine Systems Annual Program Review Meeting", "Overview of GE's H Gas Turbine Combined Cycle", Cook et al., p. 49–72, Nov., 1996.

"Proceedings of the Advanced Turbine Systems Annual Program Review Meeting", "Allison Advanced Simple Cycle Gas Turbine System", William D. Weisbrod, p. 73–94, Nov., 1996.

"Proceedings of the Advanced Turbine Systems Annual Program Review Meeting", "The AGTSR Industry–University Consortium", Lawrence P. Golan, p. 95–110, Nov., 1996.

"Proceedings of the Advanced Turbine Systems Annaul Program Review Meeting", "$NO_x$ and CO Emissions Models for Gas–Fired Lean–Premixed Combustion Turbines", A. Mellor, p. 111–122, Nov., 1996.

"Proceedings of the Advanced Turbine Systems Annual Program Review Meeting", "Methodologies for Active Mixing and Combustion Control", Uri Vandsburger, p. 123–156, Nov., 1996.

"Proceedings of the Advanced Turbine Systems Annual Program Review Meeting", "Combustion Modeling in Advanced Gas Turbine Systems", Paul O. Hedman, p. 157–180, Nov., 1996.

"Proceedings of the Advanced Turbine Systems Annual Program Review Meeting", "Manifold Methods for Methane Combustion", Stephen B. Pope, p. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, p. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, p. 211–232, Nov., 1996.

"Proceedings of the Advanced Turbine Systems Annual Program Review Meeting", "Combustion Instability Studies Application to Land–Based Gas Turbine Combustors", Robert J. Santoro, p. 233–252.

"Proceedings of the Advanced Turbine Systems Annual Program Review Meeting", "Active Control of Combustion Instabilities in Low $NO_x$ Turbines", Ben T. Zinn, p. 253–264, Nov., 1996.

"Proceedings of the Advanced Turbine Systems Annual Program Review Meeting", "Life Prediction of Advanced Materials for Gas Turbine Application," Sam Y. Zamrik, p. 265–274, Nov., 1996.

"Proceedings of the Advanced Turbine Systems Annual Program Review Meeting", "Combustion Chemical Vapor Deposited Coating for Thermal Barrier Coating Systems", W. Brent Carter, p. 275–290, Nov., 1996.

"Proceedings of the Advanced Turbine Systems Annual Program Review Meeting", "Compatibility of Gas Turbine Materials with Steam Cooling", Vimal Desai, p. 291–314, Nov., 1996.

"Proceedings of the Advanced Turbine Systems Annual Program Review Meeting", "Bond Strength and Stress Measurements in Thermal Barrier Coatings", Maurice Gell, p. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, p. 335–356, Nov., 1996.

"Proceedings of the Advanced Turbine Systems Annual Program Review Meeting", "Flow Characteristics of an Intercooler System for Power Generating Gas Turbines", Ajay K. Agrawal, p. 357–370, Nov., 1996.

"Proceedings of the Advanced Turbine Systems Annual Program Review Meeting", "Improved Modeling Techniques for Turbomachinery Flow Fields", B. Lakshiminarayana, p. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, p. 393–406, Nov., 1996.

"Proceedings of the Advanced Turbine Systems Annual Program Review Meeting", "Advanced Turbine Cooling, Heat Transfer, and Aerodynamic Studies", Je–Chin Han, p. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Archarya, p. 427–446.

"Proceedings of the Advanced Turbine Systems Annual Program Review Meeting", "Experimental and Computational Studies of Film Cooling with Compound Angle Injection", R. Goldstein, p. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, p. 461–470, Nov., 1996.

"Proceedings of the Advanced Turbine Systems Annual Program Review Meeting", "Steam as a Turbine Blade Coolant: External Side Heat Transfer", Abraham Engeda, p. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, p. 483–498, Nov., 1996.

"Proceedings of the Advanced Turbine Systems Annual Program Review Meeting", "Closed–Loop Mist/Steam Cooling for Advanced Turbine Systems", Ting Wang, p. 499–512, Nov., 1996.

"Proceedings of the Advanced Turbine Systems Annual Program Review Meeting", "Heat Pipe Turbine Vane Cooling", Langston et al., p. 513–534, Nov., 1996.

"Proceedings of the Advanced Turbine Systems Annual Program Review Meeting", "EPRI's Combustion Turbine Program: Status and Future Directions", Arthur Cohn, p. 535,–552 Nov., 1996.

"Proceedings of the Advanced Turbine Systems Annual Program Review Meeting", "ATS Materials Support", Michael Karnitz, p. 553–576, Nov., 1996.

"Proceedings of the Advanced Turbine Systems Annual Program Review Meeting", "Land Based Turbine Casting Initiative", Boyd A. Mueller, p. 577–592, Nov., 1996.

"Proceedings of the Advanced Turbine Systems Annual Program Review Meeting", "Turbine Airfoil Manufacturing Technology", Charles S. Kortovich, p. 593–622, Nov., 1996.

"Proceedings of the Advanced Turbine Systems Annual Program Review Meeting", "Hot Corrosion Testing of TBS's", Norman Bornstein, p. 623–631, Nov., 1996.

"Proceedings of the Advanced Turbine Systems Annual Program Review Meeting", "Ceramic Stationary Gas Turbine", Mark van Roode, p. 633–658, Nov., 1996.

"Proceedings of the Advanced Turbine Systems Annual Program Review Meeting", "Western European Status of Ceramics for Gas Turbines", Tibor Bornemisza, p. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine—High Efficiency, Low Cost of Electricity and Low Emissions", Roger Schonewald and Patrick Marolda, (no date available).

"Testing Program Results Validate GE's H Gas Turbine—High Efficiency, Low Cost of Electricity and Low Emissions", Slide Presentation—working draft, (no date available).

"The Next Step in H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Nos. DOE/MC/31176—5628.

"Utility Advanced Turbine Systems (ATS) Technology Readiness Testing—Phase 3", Document #666274, Oct. 1, 1996–Sep. 30, 1997, Publication Date, Dec. 31, 1997, Report Nos.: DOE/MC/31176—10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Nos.: DOE/MC/31176—5340.

"Utility Advanced Turbine System (ATS) Technology Readiness Testing and Pre–Commercial Demonstratin—Phase 3", Document #486132, Apr. 1–Jun. 30, 1976, Publication Date, Dec. 31, 1996, Report Nos.: DOE/MC/31176—5660.

"Utility Advanced Turbine System (ATS) Technology Readiness Testing and Pre–Commercial Demonstration–Phase 3", Document #587906, Jul. 1–Sep. 30, 1995, Publication Date, Dec. 31, 1995, Report Nos.: DOE/MC/31176—5339.

"Utility Advanced Turbine System (ATS) Technology Readiness Testing and Pre–Commercial Demostration" Document #666277, Apr. 1–Jun. 30, 1997, Publication Date, Dec. 31, 1997, Report Nos.: DOE/MC/31176—8.

"Utility Advanced Turbine System (ATS) Technology Readiness Testing and Pre–Commercialization Demonstration" Jan. 1,–Mar. 31, 1996, DOE/MC/31176—5338.

"Utility Advanced Turbine System (ATS) Technology Readiness Testing: Phase 3R", Document #756552, Apr. 1–Jun. 30, 1999, Publication Date, Sep. 1, 1999, Report Nos.: DE—FC21–95MC31176–23.

"Utility Advanced Turbine System (ATS) Technology Readiness Testing.", Document #656823, Jan. 1–Mar. 31, 1998, Publication Date, Aug. 1, 1998, Report Nos. DOE/MC/31176–17.

"Utility Advanced Turbine System (ATS) Technology Readiness Testing and Pre–Commercial Demonstration", Annual Technical Progress Report, Reporting Period: Jul. 1, 1995–Sep. 30, 1996.

"Utility Advanced Turbine Systems (ATS) Technology Readiness Testing", Phase 3R, Annual Technical Progress Report, Reporting Period: Oct. 1, 1997–Sep. 30, 1998.

"Utility Advanced Turbine Systems (ATS) Technology Readiness Testing", Document #750405, Oct. 1–Dec. 30, 1998, Publication Date: May 1, 1999, Report Nos.: DE–FC21–95MC31176–20.

"Utility Advanced Turbine Systems (ATS) Technology Readiness Testing", Document #1348, Apr. 1–Jun. 29, 1998, Publication Date Oct. 29, 1998, Report Nos. DE–FC21–95MC31176—18.

"Utility Advanced Turbine Systems (ATS) Technology Readiness Testing—Phase 3", Annual Technical Progress, Report, Reporting Period: Oct. 1, 1996–Sep. 30, 1997.

"Utility Advanced Turbine Systems (ATS) Technolgy Readiness Testing and Pre–Commercial Demostration", Quarterly Report, Jan. 1–Mar. 31, 1997, Document #666275, Report Nos.: DOE/MC/31176–07.

"Proceedings of the 1997 Advanced Turbine Systems", Annual Program Review Meeting, Oct. 28–29, 1997.

* cited by examiner

COOLING SYSTEM FOR A GAS TURBINE

This invention was made with Government support under Contract No. DE-FC21-95MC31176 awarded by the Department of Energy. The Government has certain rights in this invention.

BACKGROUND OF THE INVENTION

The present invention relates generally to gas turbines for power generation employing closed-circuit cooling paths for flowing a cooling medium, e.g., steam, to cool the hot gas path components and returning the spent cooling medium to a return, for example, a heat recovery steam generator used in a combined-cycle system. More particularly, the present invention relates to a manifold system for supplying the cooling medium to the buckets of the first and second-stage wheels and returning the spent cooling medium from the buckets to a heat recovery generator.

Cooling of hot gas path components, for example, the buckets of a gas turbine, has been proposed in the past and found particularly efficacious in land-based power generating systems. While gas turbines are typically air-cooled, for example, jet engines employ compressor discharge air for cooling the hot gas components, steam cooling in land-based power generating turbines has been proven more efficient in that the losses associated with the use of steam as a coolant are not as great as the losses realized by extracting compressor bleed air for cooling purposes. Also, in combined-cycle operations, steam cooling is particularly advantageous because the heat energy imparted to the steam as it cools the gas turbine components is recovered as useful work in driving the steam turbine in the combined-cycled operation.

In U.S. Pat. No. 5,593,274, of common assignee herewith, there is disclosed a gas turbine having coaxial steam passages for supplying cooling steam to hot gas components of a rotor, for example, the buckets, and returning the spent cooling steam to a return. Various refinements and improvements to that system have since been proposed. For example, in U.S. patent applications Ser. Nos. 09/489,672 and 09/731,982, an advanced steam cooling system is disclosed. In that system, coaxial supply and return pipes are provided in the rotor bore in communication with a plurality of circumferentially spaced, radially extending tubes for communicating supply cooling steam to and spent return cooling steam from adjacent the rim of the rotor, respectively. A plurality of axially extending cooling steam supply passages are provided at circumferentially spaced locations about the rotor rim. Likewise, a plurality of axially extending, circumferentially spaced return passages are located about the rotor rim. Each supply passage communicates cooling medium from a radial supply tube to a circumferentially extending manifold segment located between the second-stage wheel and the first spacer. Supply tubes extend in forward and aft directions from each supply manifold segment for supplying cooling steam to each of the first and second-stage buckets on the first and second-stage wheels. The return manifold segments are located between the first-stage wheel and the first spacer. Each return manifold segment has tubes in communication with the buckets of the first and second-stage wheels for receiving spent cooling steam and returning the spent cooling steam to the return manifold segment for return along the axial passage to a radial tube for delivery to a heat recovery steam generator. It will be appreciated that multiple supply and return tubes are provided and that there is only a small space for providing the manifold segments, tubes and passages necessary to provide an evenly distributed flow at acceptable pressure losses. Accordingly, there is a need to provide manifold segments in the cooling system of such turbines which make economical use of the allotted space, while simultaneously affording uniform flow at low pressure losses.

BRIEF SUMMARY OF THE INVENTION

In accordance with a preferred embodiment of the present invention, there are provided a plurality of circumferentially extending supply manifold segments, each having a configuration for uniformly distributing the flow of the cooling medium to the first and second-stage buckets, while simultaneously making economical use of the space available for the cooling system. Particularly, each supply manifold segment is disposed in the form of an arc for disposition adjacent the rim of the rotor and has a radially inwardly centrally located inlet in communication with the axial supply passage for supplying cooling steam into the manifold segment. The arcuate portion of each supply manifold segment includes a plurality of exit ports for supplying cooling steam via passageways to each of the first and second-stage buckets of the respective first and second turbine wheels. The supply exit ports open through opposite axial faces of the supply manifold segment and an internal guide is provided for uniformly distributing the cooling flow substantially evenly to the exit ports. The supply manifold segments also have a series of circumferentially spaced recesses along their radial outer surfaces, for reasons which will become clear.

The return manifold segments are also circumferentially spaced one from the other about the rim of the rotor. Each return segment includes a central, radially inward outlet port in communication with the axial return passage for returning spent cooling steam from the return manifold segment to the heat recovery steam generator. Each return manifold segment includes a plurality of inlet ports along opposite axial faces for receiving spent cooling steam from the buckets of the first and second-stage wheels. A plurality of guide vanes are disposed along the inside faces of each return manifold segment to guide the returning spent cooling steam from the inlet ports to the outlet port. These guide vanes reduce the whirling effect of the steam which otherwise creates very high pressure losses.

The supply and return manifold segments are preferably located at substantially the same radial locations about the rotor rim. Crossover tubes are provided each manifold segment to enable flow past the other segment. For example, the supply manifold segment includes crossover tubes extending forwardly below the wings of the return manifold segment for connection with the first-stage buckets. Certain of those crossover tubes extend through openings in the return manifold segments. Likewise, each return manifold segment includes a crossover tube which extends in an aft direction for receiving spent cooling steam from the second-stage buckets. The crossover tubes extend through the recesses along the arcuate rim of the supply manifold segments.

Retention systems are provided for retaining each of the supply and return manifold segments against axial, radial and circumferential displacement relative to the rotor. Preferably, the outer rim of each segment includes one or more ribs for engaging in a recess of an overlying flange on the spacer whereby the segments are prevented from displacement in opposite axial directions. The radial inner projections of the supply and return manifold segments engage a flange and a face on the second and first-stage wheels, respectively, to preclude substantial axial movement in the respective aft and forward directions. Additionally, protuberances projecting from the forward and aft faces of the supply and return manifold segments, respectively, bear against the aft and forward surfaces of the spacer to preclude axial displacement of the segments. To preclude substantial circumferential movement of the segments, a projection having flats on opposite sides thereof is provided on the forward and rear faces of the supply and return manifold segments, respectively. These projections engage in linearly extending slots formed in the aft and forward faces of the spacer, the radial extent of these slots exceeding the radial extent of the projections. Thus, the manifold segments are enabled for radial displacement which is necessary for field assembly and disassembly, while the segments are simultaneously maintained against circumferential displacement about the rotor.

In a preferred embodiment according to the present invention, there is provided a turbine rotor having axially spaced wheels mounting buckets and a spacer between the wheels, a cooling system for cooling the buckets, comprising a plurality of manifold segments circumferentially spaced from one another about and adjacent the rim of the rotor, each manifold segment lying in communication with at least one passage for flowing a cooling medium to or from the manifold segment, each manifold segment having a plurality of ports in communication with flow passageways of turbine buckets of at least one of the turbine wheels, a retention system carried by the manifold segments and cooperable with the spacer for securing the manifold segments to the spacer against substantial axial movement relative to the rotor including a flange on the spacer having one of a generally radially projecting rib and a recess and another of the rib and the recess on each manifold segment, the rib being engageable in the recess to retain the manifold segment on the spacer against substantial axial movement.

In a further preferred embodiment according to the present invention, there is provided a turbine rotor having axially spaced wheels mounting buckets and a spacer between said wheels, a cooling system for cooling the buckets, comprising a plurality of manifold segments circumferentially spaced from one another about and adjacent the rim of the rotor, each manifold segment lying in communication with at least one passage for flowing a cooling medium to or from the manifold segment, each manifold segment having a plurality of ports in communication with flow passageways of turbine buckets of at least one of the turbine wheels, a retention system carried by the manifold segments and cooperable with the spacer for securing the manifold segments to the spacer against substantial movement in a circumferential direction relative to the rotor including slots on one of the spacer and the manifold segments and stops on another of the spacer and the manifold segments engageable with walls of the slots to preclude substantial movement of the manifold segments in a circumferential direction relative to the rotor.

In a further preferred embodiment according to the present invention, there is provided a turbine rotor having axially spaced wheels mounting buckets and spacers between said wheels, a cooling system for cooling the buckets, comprising a plurality of cooling medium supply passages circumferentially spaced from one another about and adjacent a rim of the rotor, a plurality of spent cooling medium return passages circumferentially spaced from one another about and adjacent the rim of the rotor, a plurality of supply manifold segments circumferentially spaced from one another about and adjacent the rim of the rotor, each supply manifold segment lying in communication with at least one of the supply passages for receiving the cooling medium from one supply passage, each supply manifold segment having a plurality of exit ports connecting the supply manifold segment and cooling medium inlets for the turbine buckets of selected axially spaced wheels, a plurality of return manifold segments circumferentially spaced from one another about and adjacent a rim of the rotor, each return manifold segment lying in communication with at least one of the return passages for flowing spent cooling medium from the return manifold segment to the one return passage, each return manifold segment having a plurality of inlet ports connecting the return manifold segment and spent cooling medium outlets for the turbine buckets of selected axially spaced wheels and at least one guide vane within each plurality of supply manifold segments for substantially uniformly distributing the cooling medium to the exit ports.

In a further preferred embodiment according to the present invention, there is provided a turbine rotor having axially spaced wheels mounting buckets and spacers between said wheels, a cooling system for cooling the buckets, comprising a plurality of cooling medium supply passages circumferentially spaced from one another about and adjacent a rim of the rotor, a plurality of spent cooling medium return passages circumferentially spaced from one another about and adjacent the rim of the rotor, a plurality of supply manifold segments circumferentially spaced from one another about and adjacent the rim of the rotor, each supply manifold segment lying in communication with at least one of the supply passages for receiving the cooling medium from one supply passage, each supply manifold segment having a plurality of exit ports connecting the supply manifold segment and cooling medium inlets for the turbine buckets of selected axially spaced wheels, a plurality of return manifold segments circumferentially spaced from one another about and adjacent a rim of the rotor, each return manifold segment lying in communication with at least one of the return passages for flowing spent cooling medium from the return manifold segment to the return passage, each return manifold segment having a plurality of inlet ports connecting the return manifold segment and spent cooling medium outlets for the turbine buckets of selected axially spaced wheels and a plurality of guide vanes within each of the plurality of return manifold segments for guiding the spent cooling medium received from the plurality of inlet ports to the return passage to eliminate pressure losses within the return manifold.

DETAILED DESCRIPTION OF THE INVENTION

Figure 1:
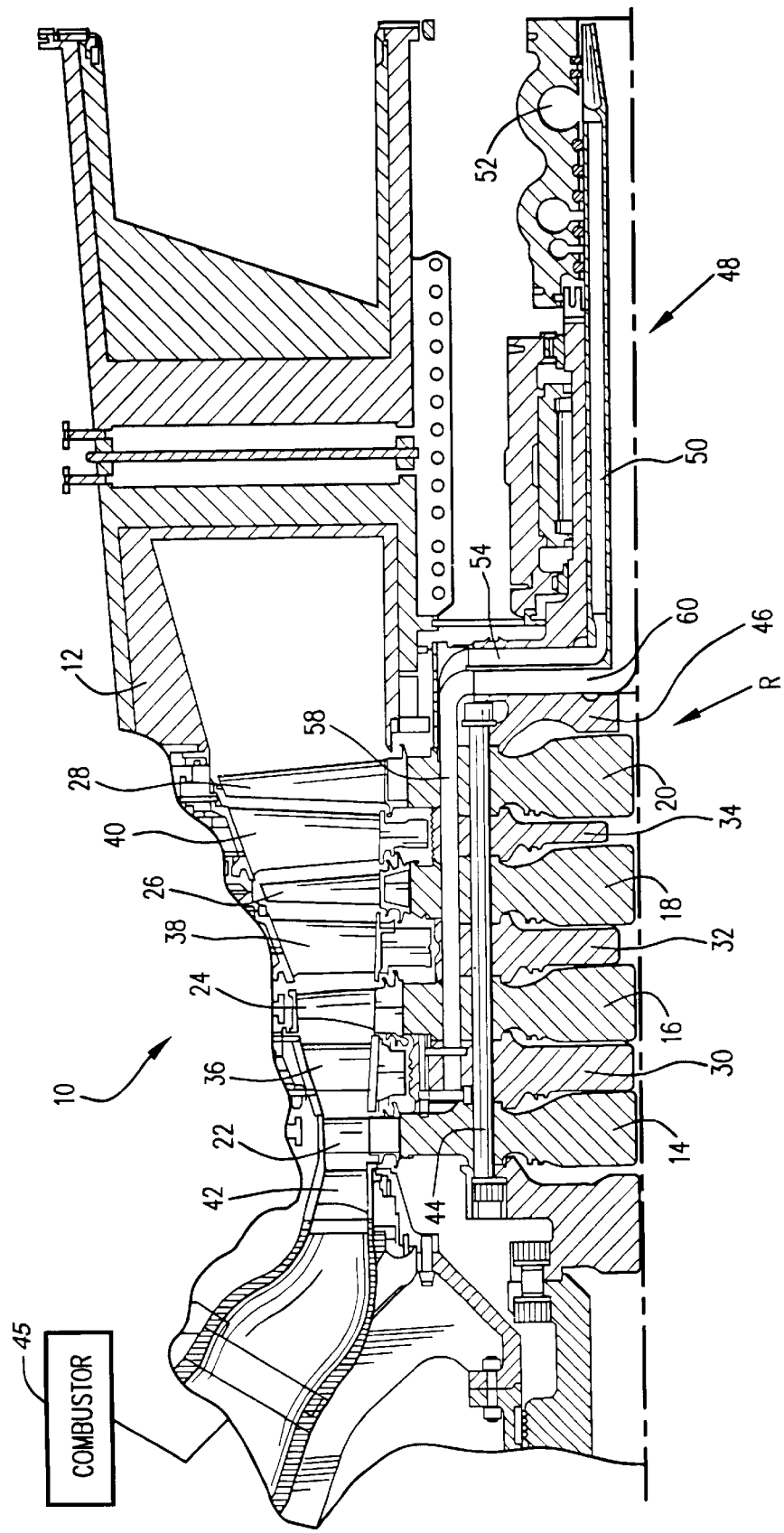
FIG. 1 is a cross-sectional view of a portion of a gas turbine illustrating a turbine section thereof incorporating portions of a cooling system according to a preferred embodiment of the present invention.

Referring now to the drawings, particularly to FIG. 1, there is illustrated a turbine section, generally designated 10, incorporating a preferred embodiment of the present invention. The turbine section 10 includes a turbine housing 12 surrounding a turbine rotor R. Rotor R includes in the present example four successive stages comprising wheels 14, 16, 18 and 20, carrying a plurality of circumferentially spaced buckets or blades 22, 24, 26 and 28, respectively. The wheels are arranged alternately between spacers 30, 32 and 34. The outer rims of spacers 30, 32 and 34 lie in radial registration with a plurality of stator blades or nozzles 36, 38 and 40, with the first set of nozzles 42 lying forwardly of the first buckets 22. Consequently, it will be appreciated that a four-stage turbine is illustrated wherein the first stage comprises nozzles 42 and buckets 22; the second stage, nozzles 36 and buckets 24; the third stage, nozzles 38 and buckets 26 and, finally, the fourth stage, nozzles 40 and buckets 28. The rotor wheels and spacers are secured one to the other by a plurality of circumferentially spaced bolts 44 passing through aligned openings in the wheels and spacers. A plurality of combustors, one being schematically illustrated at 45, are arranged about the turbine section to provide hot gases of combustion through the hot gas path of the turbine section comprising the nozzles and buckets for rotating the rotor. The rotor also includes an aft disk 46 formed integrally with a bore tube assembly, generally designated 48 defining an aft shaft.

Figure 7:
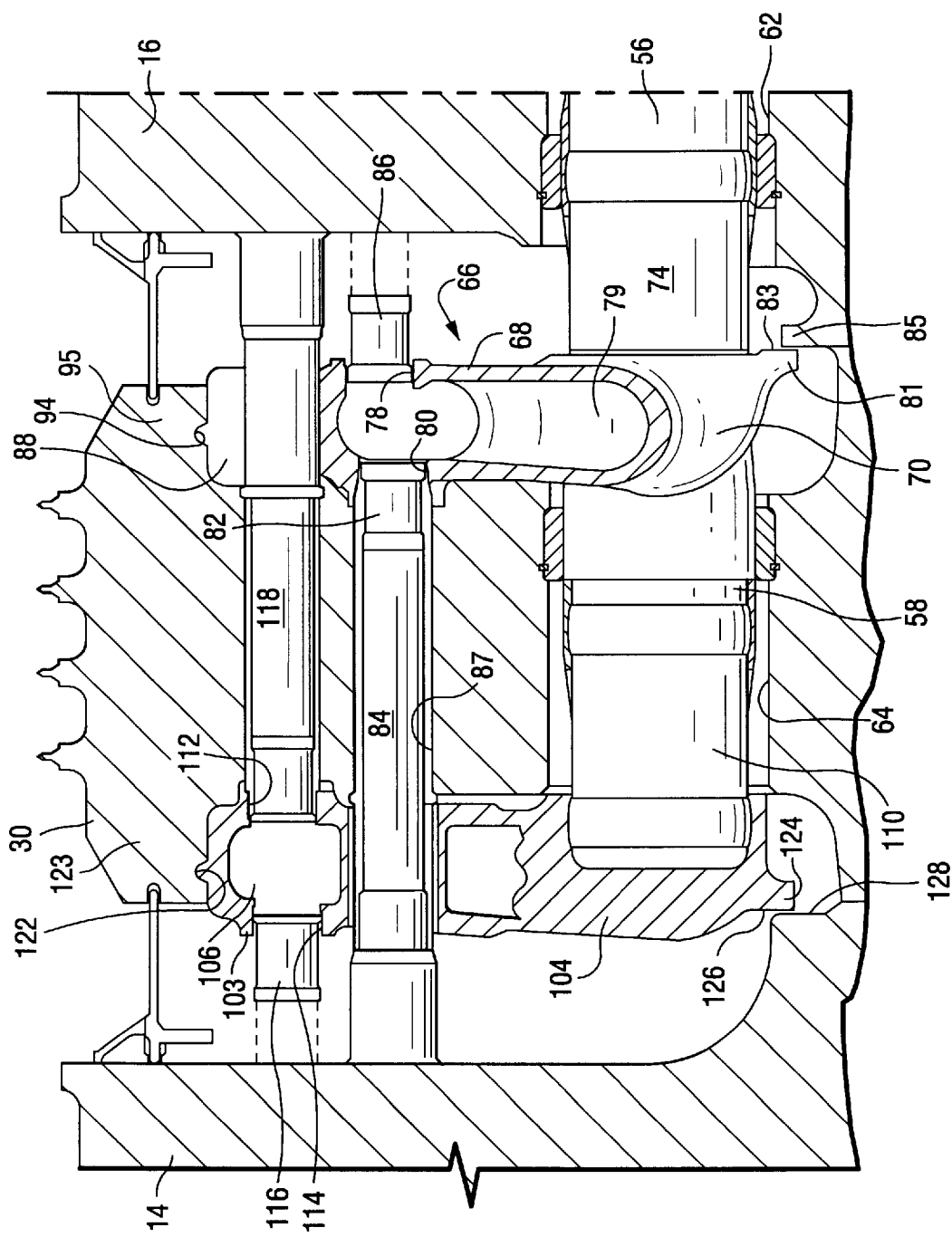
FIG. 7 is a fragmentary cross-sectional view of a portion of the outer rim of the rotor illustrating the supply and return manifold segments.

At least one, and preferably both sets of buckets 22 and 24, preferably of the first two stages, are provided with a thermal cooling medium, preferably steam, for cooling the buckets. Cooling steam is supplied and returned through the bore tube assembly 48. The bore tube assembly 48 includes an annular passage 50 supplied with cooling steam from a steam supply, not shown, for flow to a plurality of radially extending tubes 54 provided in the aft disk 46. Tubes 54 communicate with circumferentially spaced, axially extending thermal medium supply tubes or passage 56 (FIG. 7) in communication with cooling passages in the first and second-stage buckets. Spent or returned cooling steam at an elevated temperature flows from the first and second-stage buckets through a plurality of circumferentially spaced, axially extending return tubes or passages 58 (FIGS. 1 and 7). Return tubes 58 communicate at their aft ends with radially inwardly extending return tubes 60 (FIG. 1) in aft disk 46. From tubes 60, the spent cooling steam flows into the central bore, not shown, of the bore tube assembly 48 for return to a supply or for flow to a heat recovery steam generator for use in a combined-cycle system.

It will be appreciated from the foregoing description that the axially extending supply and return passages 56 and 58, respectively, lie adjacent the rim of and circumferentially about the rotor, with each supply and return tube extending through axially aligned openings of the axially stacked wheels and spacers. For example, in FIG. 7, the supply tube or passage 56 is illustrated passing through the opening 62 in the second-stage wheel. The return tube or passage 58 is illustrated in FIG. 7 as passing through an opening 64 in the first spacer 30. Various bushings are provided at axially spaced locations within the openings of the wheels and spacers for supporting the supply and return tubes 56 and 58, respectively, in the wheels and spacers.

Figure 2:
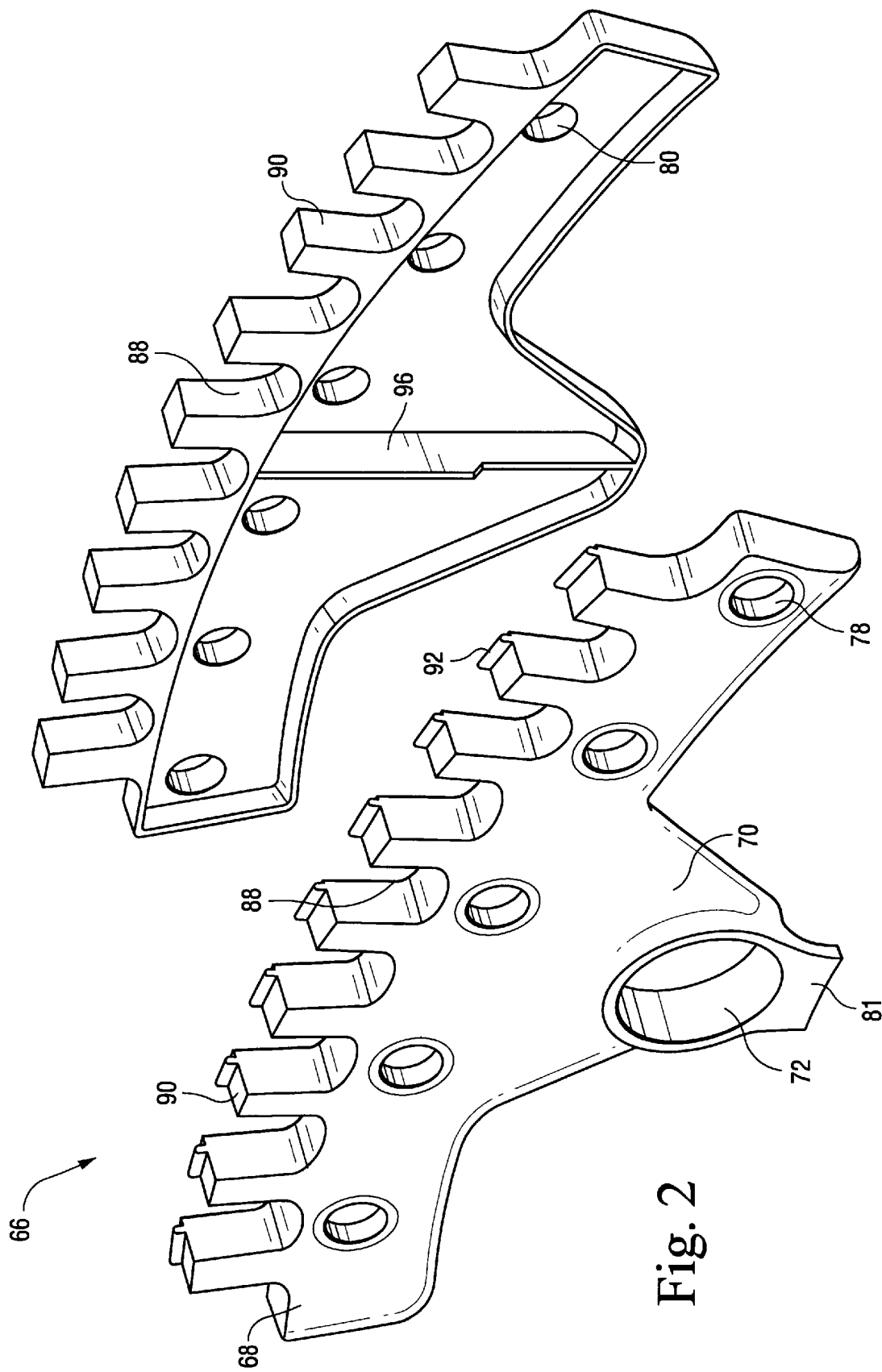
FIG. 2 is an exploded perspective view of opposing portions of a supply manifold segment according to a preferred embodiment of the present invention.
Figure 3:
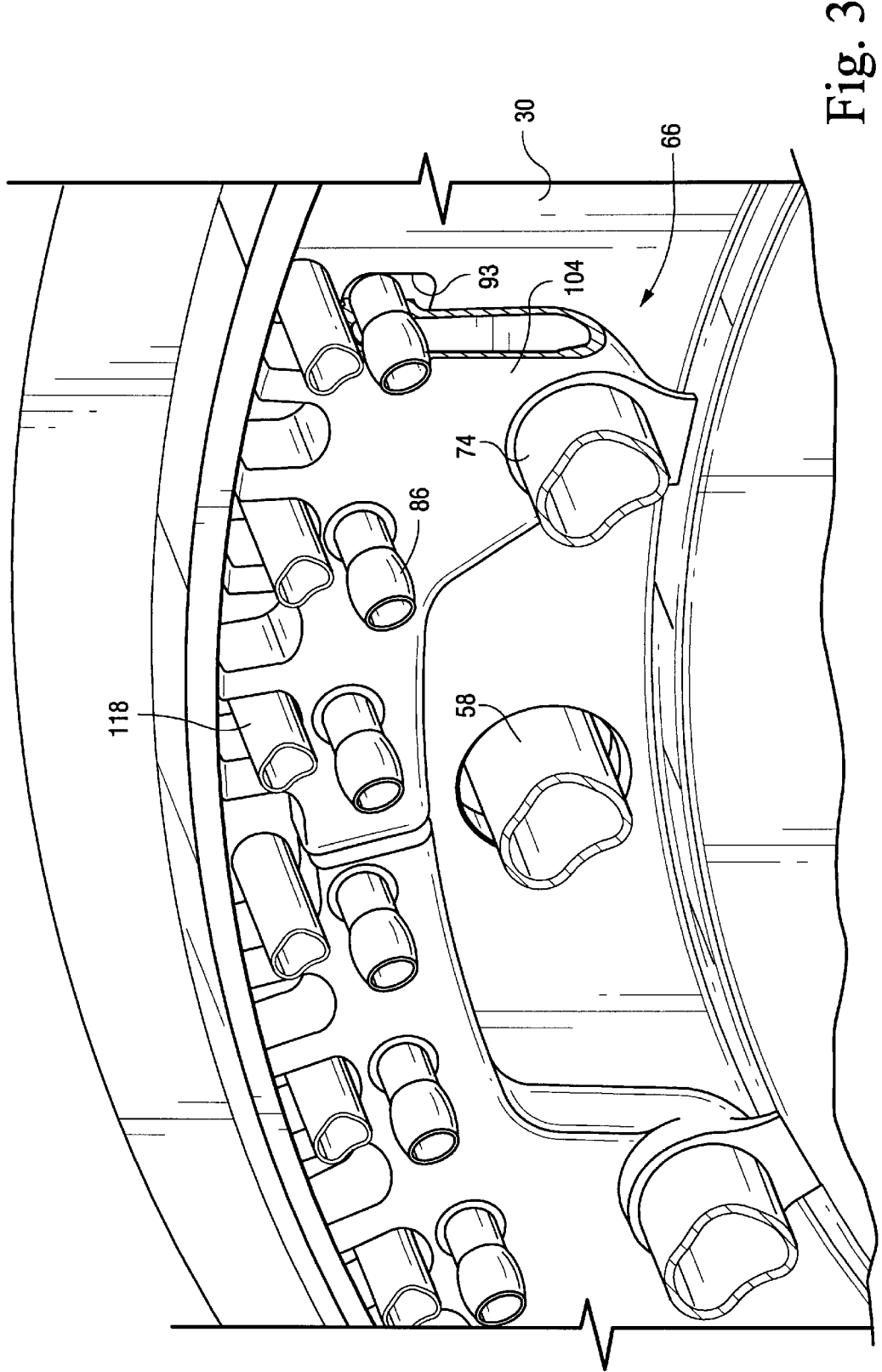
FIG. 3 is a fragmentary perspective view of the aft face of the supply manifold illustrating supply and return tubes relative to the second-stage buckets.
Figure 4:
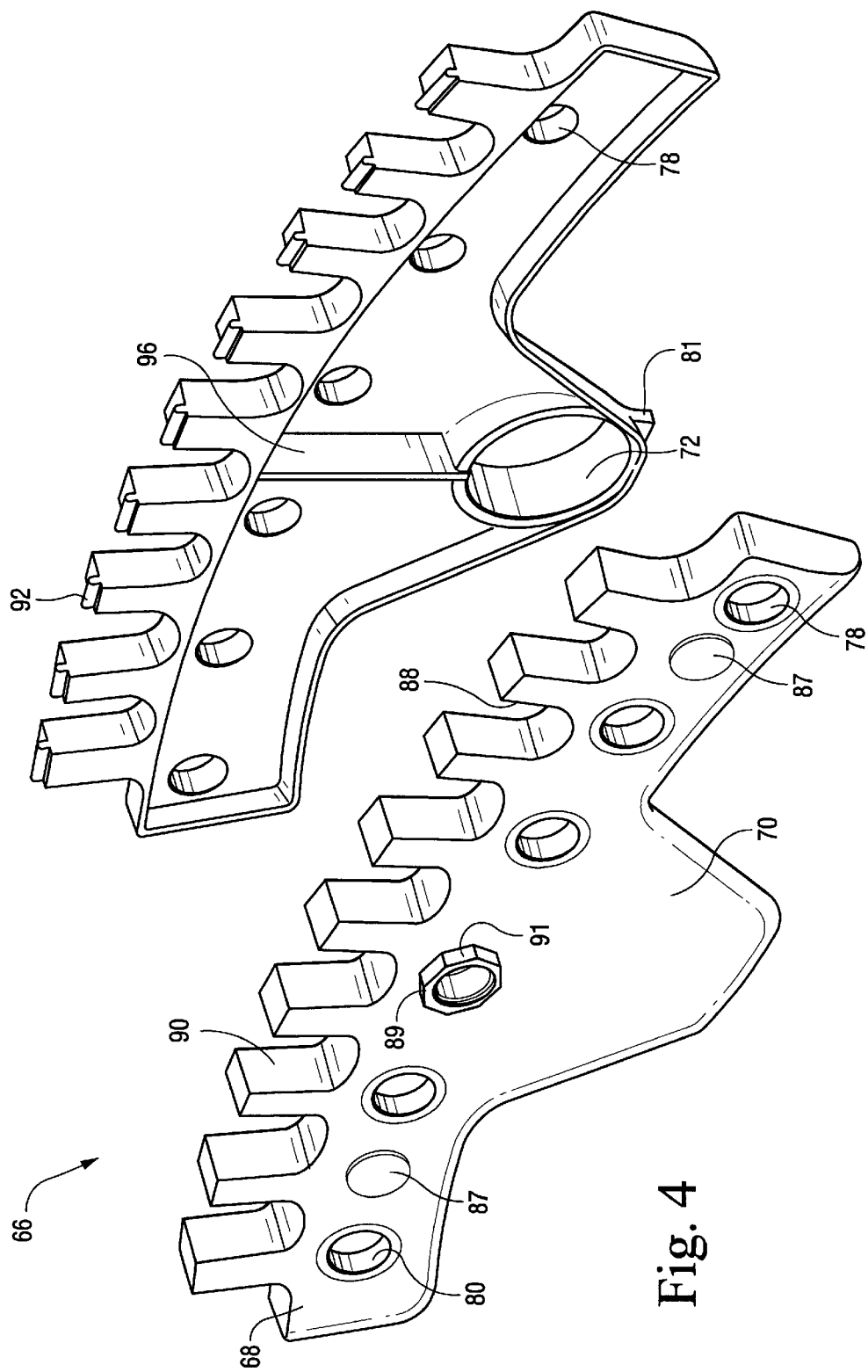
FIG. 4 is an exploded perspective view of a forward face of the supply manifold segment according to a preferred embodiment of the present invention.

Referring now to FIGS. 2–4 and 7, it will be appreciated that each of the cooling medium supply passages 56 supplies cooling medium to a supply manifold segment, generally designated 66. A plurality of the circumferentially spaced supply manifold segments 66 form a supply manifold, the segments 66 being preferably located between the aft face of spacer 30 and the forward face of the second-stage wheel 16. In FIGS. 2 and 4, each supply manifold segment is illustrated as comprising two opposed halves. It will be appreciated that the segments 66 may be provided as a unitary construction. A supply manifold segment 66 is provided for each supply passage 56 and, as illustrated in FIG. 2, includes an arcuate rim 68 having a depending central and radially inwardly extending projection 70. Projection 70 has an inlet port 72 opening in an axially aft direction for connection with the cooling medium supply tube or passage 56. Preferably, a spoolie 74 is provided to interconnect the supply tube 56 and the inlet 72 of each supply segment 66. The spoolies 74 comprise short tubes having spherical-shaped end portions.

Each supply manifold segment 66 also includes a plurality of exit ports 78 and 80 along respective axially opposite end faces thereof, each in communication with a plenum 79 (FIG. 7) within the manifold segment and supplied with cooling steam via inlet 72. As illustrated in FIG. 2, the supply manifold segment 66 has six exit ports 80 opening in an axially forward direction for supplying cooling medium to the buckets of the adjacent wheel, i.e., the buckets 22 of the first-stage wheel 14. As illustrated in FIG. 7, the six exit ports 80 are connected via spoolies 82 with crossover tubes 84 for supplying cooling steam to the buckets of the first-stage wheel. Each exit port 80 thus registers axially with a passage 87 through the spacer 30 which receives the crossover tube 84. As also illustrated in FIG. 7, spoolies 86 are employed to interconnect the exit ports 78 and supply tubes, not shown, within the dovetails of the second-stage buckets 24.

As best illustrated in FIGS. 2 and 4, the radial outer margin of each supply manifold segment 66 includes a plurality of recesses 88, for reasons discussed below, forming an essentially sawtooth pattern along the outer margin. Each projection or tooth 90 of the segment 66 includes a radially outwardly extending rib 92 for engaging below a groove or recess 94 (FIG. 7) formed along an annular radially inwardly facing surface of a flange 95 about the rear face of the spacer 30. The engagement of the ribs 92 in the grooves or recesses 94 forms part of a retention system for maintaining the supply manifold segment 66 against substantial axial movement. The retention system also includes the connections between the inlet 72 and passage 56, as well as the tubular connections with the exit ports 78 and 80. Further, the radial projection 70 of each segment 66 includes a radial inwardly directed flange 81 having a step with an axially directed surface 83 (FIG. 7) for engaging a flange or stop 85 on the adjacent second-stage wheel 16. This engagement also precludes substantial axial movement of segment 66 in an aft direction. Still further, protuberances or stops 87 (FIG. 4) project from the forward face of the supply manifold segment 66 and engage against the aft face of the spacer 30 to preclude displacement of segment 66 in a forward direction.

The forward face of the supply manifold segment 66 also includes a projection or stop 89 having flats 91 on opposite sides thereof. The aft face of spacer 30 includes a linear slot 93 (FIG. 3) extending in a radial direction a distance in excess of the radial extent of projection 89. The side flats 91 of projection 89 engage the side walls of the slot when projection 89 is received in slot 93. This enables the manifold segment for radial movement (necessary for field assembly and disassembly) while maintaining the segment 66 against circumferential movement about the rotor.

It will be appreciated therefore that cooling steam supplied via axial cooling tube or passage 56 passes through inlet 72 into the plenum of the manifold segment 66 for exit through the ports 80 and 78 and delivery to the buckets 22 and 24 of the first and second stages, respectively. To provide uniform flow distribution to the exit ports 78 and 80, a guide vane 96 (FIG. 4) is provided centrally within the plenum to divide the flow equally among the ports 78 and 80 on opposite sides of the segment.

Figure 5:
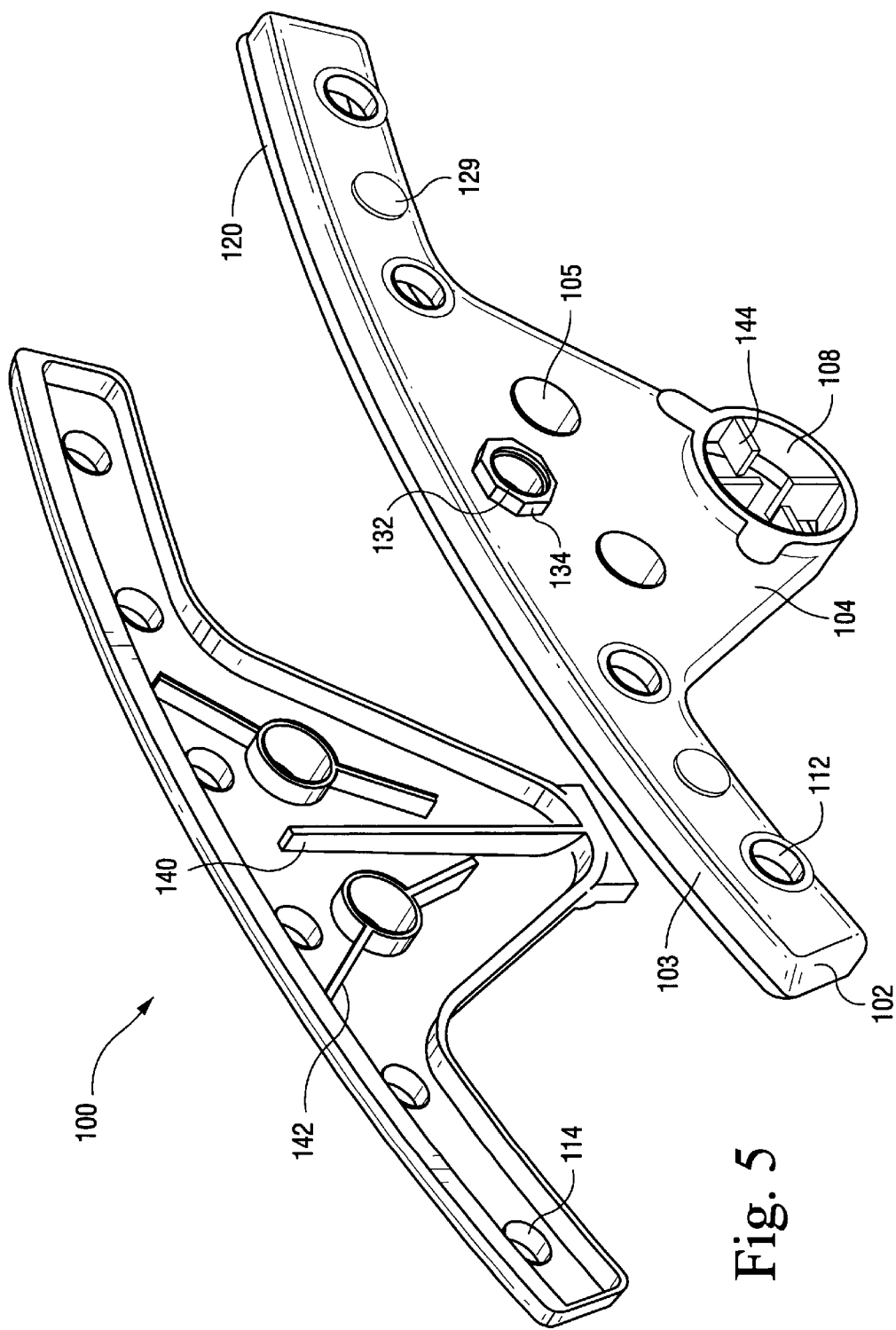
FIG. 5 is an exploded perspective view of portions of a return manifold segment according to a preferred embodiment of the present invention.
Figure 6:
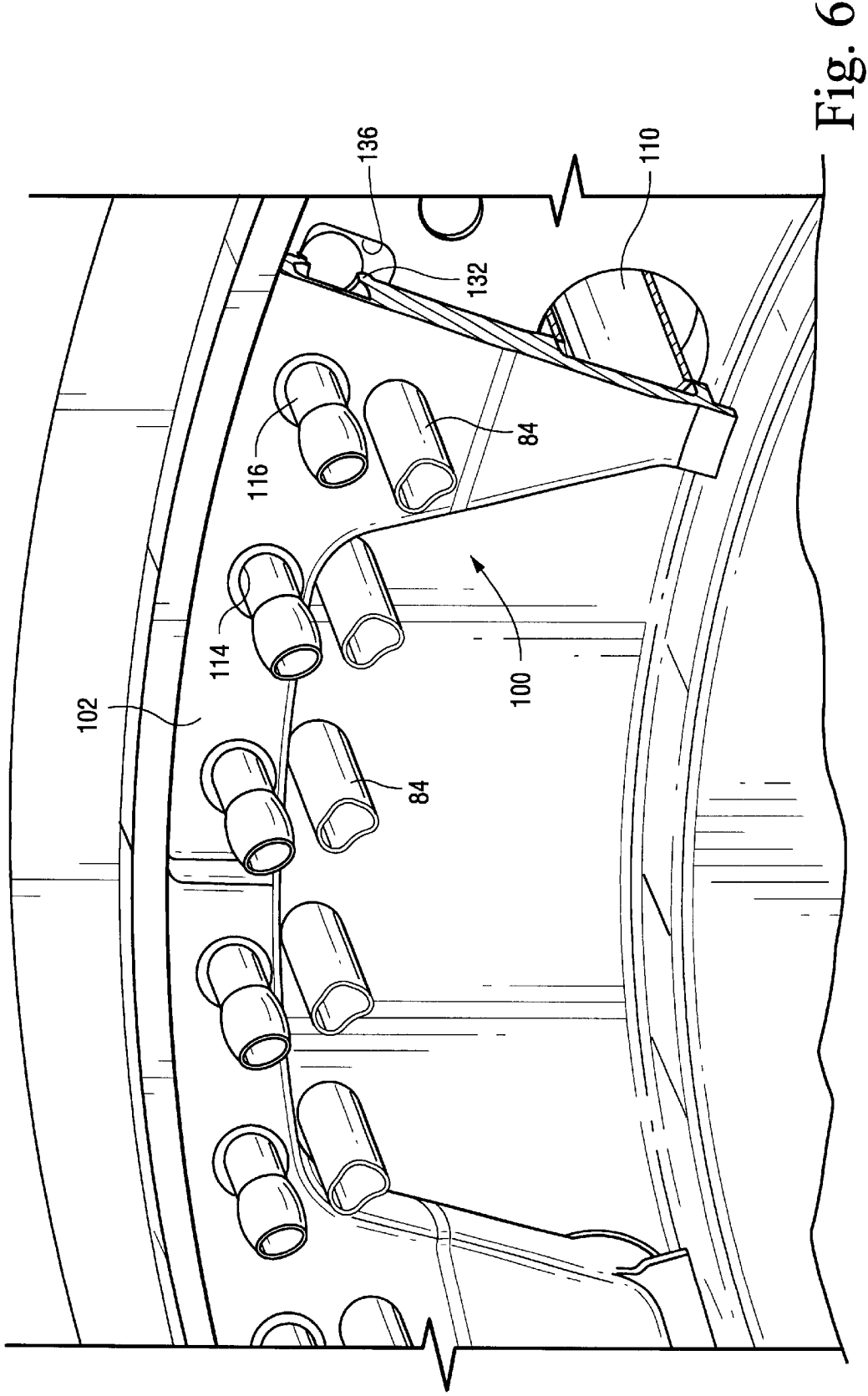
FIG. 6 is a fragmentary perspective view of a forward face of the return manifold segment illustrating the inlet ports for receiving return steam, as well as supply tubes below the return manifold segment for supplying steam to the first-stage buckets.

Referring now to FIGS. 5–7, there is illustrated a return manifold segment, generally designated 100, for returning spent cooling medium from the buckets of the first and second-stage wheels to the axial return passage 58. Thus, the return manifold comprises a plurality of circumferentially spaced return manifold segments 100, preferably located between the forward face of spacer 30 and the aft face of the first-stage wheel 14. In FIG. 5, the return manifold segment 100 is illustrated as comprising two opposed halves. It will be appreciated, however, that like the supply manifold segments, the return manifold segments 100 may be provided as unitary constructions. Referring to FIG. 5, each segment includes a radial, arcuate outer rim 102 and an inwardly extending projection 104, the rim 102 and projection 104 defining a plenum 106 (FIG. 7). Each projection 104 has an exit port 108 opening in an axially aft direction for flowing return steam from the manifold segment 100 to the return tube or passageway 58 via a spoolie 110 (FIG. 6).

The rim 102 of each return manifold segment 100 includes a plurality of inlet ports 112 opening in an aft direction, as well as a plurality of inlet ports 114 opening in a forward direction. To communicate spent cooling medium from the buckets 22 of the first stage to the manifold segment 100, the inlet ports 114 are connected via spoolies 116 to tubes (not shown) extending from the dovetails of the buckets 22. Crossover tubes 118 are in communication with tubes 119 projecting forwardly from the buckets 24 of the second stage wheel 16 for delivering spent cooling steam through the inlet ports 112 into the plenum 106. As illustrated in FIG. 7, the crossover tubes 118 extend in the recesses 88 of the supply manifold segments 66. The arcuate radially outer rims 102 of the return manifold segments have radially outwardly projecting ribs 120 for reception within a recess 122 formed along a radially inwardly facing annular surface of a flange 123 of the spacer 30 to retain the manifold segments against axial movement. Similarly as the supply manifold segments are retained on the spacer, the engagement of the ribs 120 in the recesses 122 forms part of a retention system for maintaining the return manifold segment 100 against substantial axial movement. The retention system also includes the connections between the exit port 108 and spoolie 110 as well as the tubular connections with the inlet ports 112 and 114. Further, the radial inward extending projection 104 of each segment 100 includes a radially inwardly directed flange 124 having a step with an axially directed surface 126 (FIG. 7) for engaging an aft face portion or stop 128 of the first-stage wheel 14. This engagement also precludes substantial axial movement of segment 100 in a forward direction. Still further, protuberances or stops 129 (FIG. 5) project from the aft face of the return manifold segment 100 and engage against the forward face of the spacer 30 to preclude the displacement of segment 100 in an aft direction.

The aft face of the return manifold segment 100 also includes a projection 132 having flats 134 on opposite sides thereof similarly as the projection 89 of the supply manifold segment 66. The forward face of spacer 30 includes a linear slot 136 (FIG. 6) extending in a radial direction a distance in excess of the radial extent of projection 132. The flats 134 of projection 132 and the side walls of the slots when projection 132 is received in slot 136 enable the return manifold segment 100 for radial movement (necessary for field assembly and disassembly) while maintaining the segment 100 against circumferential movement about the rotor.

The supply and return manifold segments are circumferentially staggered relative to one another. Thus, the juncture of the wings or legs 103 of adjacent return manifold segment 100 lie axially opposite the projecting portion 70 of a supply manifold segment 66. The four inner exit ports 80 lie in axial alignment at a radial location inwardly of the wings or legs 103 of the adjacent return manifold segments. Accordingly, pairs of the crossover tubes 84 from a supply manifold segment 66 extend axially below the wings or legs 103 of circumferentially adjacent return manifold segments 100. The latter segments 100 also have a pair of openings 105 passing centrally through the projection 104. These openings are closed relative to the plenum 106 and receive the crossover tubes 84 at the ends of circumferentially adjoining supply manifold segments.

Referring back to FIG. 5, the arcuate shape of the return manifold segments 100, together with the radial inward projection 104, terminating in the outlet 108 would normally cause high pressure losses as the steam flows from the inlet ports 112 and 114 to the outlet port 108. Essentially, a tornado or whirlwind effect would occur adjacent the outlet port 108. To eliminate these high pressure losses, a plurality of guide vanes are provided. For example, a central guide vane 140 (FIG. 5) is provided along the forward wall of the segment 100 for substantially precluding mixing the flows from the inlet ports on opposite sides of the segments. Additional guide vanes 142 having sections angularly related to one another guide the return steam toward the exit port 108 on each side of guide vane 140 with minimal pressure losses. Additionally, guide vanes 144 are provided in quadrants in the exit port 108, the guide vanes 144 terminating short of the centerline of the outlet port 108. Consequently, the swirling effect otherwise encountered in the steam as the steam flows into and from the return manifold segments is substantially reduced or eliminated so that minimal pressure losses occur.

It will be appreciated that each of the supply and return manifold segments can be integrally cast or may be formed of sections welded to one another, as illustrated in FIGS. 2 and 5.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a turbine rotor having axially spaced wheels mounting buckets and a spacer between said wheels, a cooling system for cooling the buckets, comprising:

a plurality of manifold segments circumferentially spaced from one another about and adjacent the rim of said rotor, each said manifold segment lying in communication with at least one passage for flowing a cooling medium to or from said manifold segment, each said manifold segment having a plurality of ports in communication with flow passageways of turbine buckets of at least one of said turbine wheels;

a retention system carried by said manifold segments and cooperable with the spacer for securing the manifold segments to the spacer against substantial axial movement relative to said rotor including a flange on said spacer having one of a generally radially projecting rib and a recess and another of said rib and said recess on each said manifold segment, said rib being engageable in said recess to retain the manifold segment on the spacer against substantial axial movement.

2. A cooling system according to claim 1 wherein said flange projects in an axial direction and has a radially inwardly directed surface carrying said one of said rib and recess.

3. A cooling system according to claim 1 wherein at least one of said manifold segments includes a radially inwardly directed surface adjacent a radial inward portion of said one manifold segment for engaging a stop of an adjacent wheel for precluding axial movement of said one manifold segment relative to said rotor in one axial direction.

4. A cooling system according to claim 1 wherein at least one of said manifold segments includes a plurality of axially extending stops projecting from said one manifold segment for engaging a face of said spacer.

5. A cooling system according to claim 1 including a slot on one of said spacer and one of said manifold segments and a stop on another of said spacer and said one manifold segment engageable with walls of said slot to preclude substantial movement of said one manifold segment in a circumferential direction relative to said rotor.

6. A cooling system according to claim 5 wherein said slot is configured to enable generally radial displacement of said one manifold segment relative to said spacer.

7. In a turbine rotor having axially spaced wheels mounting buckets and a spacer between said wheels, a cooling system for cooling the buckets, comprising:

a plurality of manifold segments circumferentially spaced from one another about and adjacent the rim of said rotor, each said manifold segment lying in communication with at least one passage for flowing a cooling medium to or from said manifold segment, each said manifold segment having a plurality of ports in communication with flow passageways of turbine buckets of at least one of said turbine wheels;

a retention system carried by said manifold segments and cooperable with said spacer for securing the manifold segments to the spacer against substantial movement in a circumferential direction relative to said rotor including slots on one of said spacer and said manifold segments and stops on another of said spacer and said manifold segments engageable with walls of said slots to preclude substantial movement of said manifold segments in a circumferential direction relative to the rotor.

8. A cooling system according to claim 7 wherein each said slot is configured to enable generally radial displacement of said manifold segment relative to said spacer.

9. A cooling system according to claim 7 including a flange on said spacer having one of a generally radially projecting rib and a recess and another of said rib and said recess on each said manifold segment, said ribs and said recesses being engageable with one another to secure the manifold segments to the spacer against substantial axial movement relative to the rotor.

10. A cooling system according to claim 9 wherein said flange projects in an axial direction and has a radially inwardly facing surface carrying said one of said rib and recess.

11. A cooling system according to claim 9 wherein each said manifold segment includes a radially inwardly directed surface adjacent a radial inward portion thereof for engaging a stop of an adjacent wheel for precluding axial movement of said manifold segment relative to said rotor in one axial direction.

12. A cooling system according to claim 9 wherein each said manifold segment includes a plurality of axially extending stops projecting from said manifold for engaging a face of said spacer.

13. In a turbine rotor having axially spaced wheels mounting buckets and spacers between said wheels, a cooling system for cooling the buckets, comprising:

a plurality of cooling medium supply passages circumferentially spaced from one another about and adjacent a rim of the rotor;

a plurality of spent cooling medium return passages circumferentially spaced from one another about and adjacent the rim of the rotor;

a plurality of supply manifold segments circumferentially spaced from one another about and adjacent the rim of said rotor, each said supply manifold segment lying in communication with at least one of said supply passages for receiving the cooling medium from said one supply passage, each said supply manifold segment having a plurality of exit ports connecting said supply manifold segment and cooling medium inlets for the turbine buckets of selected axially spaced wheels;

a plurality of return manifold segments circumferentially spaced from one another about and adjacent a rim of said rotor, each said return manifold segment lying in communication with at least one of said return passages for flowing spent cooling medium from the return manifold segment to the one return passage, each said return manifold segment having a plurality of inlet ports connecting said return manifold segment and spent cooling medium outlets for the turbine buckets of selected axially spaced wheels; and at least one guide vane within each said plurality of supply manifold segments for substantially uniformly distributing the cooling medium to said exit ports.

14. A cooling system according to claim 13 including a first set of said plurality of exit ports for each supply manifold segment for supplying the cooling medium to a set of buckets on one of said wheels, a second set of said plurality of exit ports for each supply manifold segment for supplying the cooling medium to a second set of buckets on another of said wheels.

15. A cooling system according to claim 13 wherein said cooling medium supply and return manifold segments are axially spaced from one another and lie at substantially the same radii about the axis of the rotor.

16. A cooling system according to claim 15 wherein one of said plurality of supply manifold segments and said plurality of return manifold segments includes an outer margin having a plurality of radially outwardly opening circumferentially spaced recesses and crossover tubes passing through selected recesses for communicating the cooling medium between another of said plurality of said supply manifold segments and said plurality of return manifold segments and the buckets of the axially spaced wheels.

17. A cooling system according to claim 15 wherein said plurality of supply manifold segments includes an outer margin having a plurality of radially outwardly opening recesses and crossover tubes in selected recesses for receiving spent cooling medium from the buckets of an adjacent wheel and return to the return manifold segments.

18. A cooling system according to claim 17 wherein said supply and return manifold segments are circumferentially staggered relative to one another.

19. In a turbine rotor having axially spaced wheels mounting buckets and spacers between said wheels, a cooling system for cooling the buckets, comprising:

a plurality of cooling medium supply passages circumferentially spaced from one another about and adjacent a rim of the rotor;

a plurality of spent cooling medium return passages circumferentially spaced from one another about and adjacent the rim of the rotor;

a plurality of supply manifold segments circumferentially spaced from one another about and adjacent the rim of said rotor, each said supply manifold segment lying in communication with at least one of said supply passages for receiving the cooling medium from said one supply passage, each said supply manifold segment having a plurality of exit ports connecting said supply manifold segment and cooling medium inlets for the turbine buckets of selected axially spaced wheels;

a plurality of return manifold segments circumferentially spaced from one another about and adjacent a rim of said rotor, each said return manifold segment lying in communication with at least one of said return passages for flowing spent cooling medium from the return manifold segment to the return passage, each said return manifold segment having a plurality of inlet ports connecting said return manifold segment and spent cooling medium outlets for the turbine buckets of selected axially spaced wheels; and a plurality of guide vanes within each of said plurality of return manifold segments for guiding the spent cooling medium received from said plurality of inlet ports to said return passage to eliminate pressure losses within the return manifold.

20. A cooling system according to claim 19 including a first set of said plurality of inlet ports for each supply manifold segment for supplying the cooling medium to a set of buckets on one of said selected wheels, a second set of said plurality of exit ports for each supply manifold segment for supplying the cooling medium to a second set of buckets on another of said wheels.

21. A cooling system according to claim 19 wherein said cooling medium supply and return segments are axially spaced from one another and lie at substantially the same radii about the axis of the rotor.

22. A cooling system according to claim 19 including a first set of said plurality of inlet ports for each return manifold segment for returning the spent cooling medium from a set of buckets on one of said selected wheels, a second set of said plurality of inlet ports for each return manifold segment for returning the spent cooling medium from a set of buckets on another of said selected wheels.

23. A cooling system according to claim 19 wherein said plurality of guide vanes includes a central rib dividing the inlet ports along said return manifold segment into equal number of inlet portions on opposite sides of the central rib.

24. A cooling system according to claim 19 wherein said plurality of vanes includes at least a further vane on each of the opposite sides of said central rib.

* * * * *